United States Patent [19]

Magnabosco

[11] Patent Number: 5,755,920
[45] Date of Patent: May 26, 1998

[54] AUTOCLAVE FOR RETREADING AND/OR REPAIRING PNEUMATIC TIRES BY VULCANIZATION

[75] Inventor: Giovanni Magnabosco, Zugliano, Italy

[73] Assignee: Bosco Trade International Corporation, Marco, Fla.

[21] Appl. No.: 623,931

[22] Filed: Mar. 28, 1996

[30] Foreign Application Priority Data

Mar. 28, 1995 [IT] Italy ................. MI95A/619

[51] Int. Cl.$^6$ .................................................. B29C 35/04
[52] U.S. Cl. .................. 156/382; 156/96; 156/421.2; 156/909; 425/18; 425/34.3
[58] Field of Search ............................... 156/909, 389, 156/421.2, 96, 382; 422/287, 295; 425/18, 17, 34.3, 445

[56] References Cited

U.S. PATENT DOCUMENTS

| | | | |
|---|---|---|---|
| 2,484,419 | 10/1949 | Miner | 425/445 |
| 3,769,121 | 10/1973 | Martin | 156/909 |
| 4,269,644 | 5/1981 | Goldstein | 425/18 |
| 4,547,241 | 10/1985 | Massey | 156/909 |

FOREIGN PATENT DOCUMENTS 86766  8/1983  European Pat. Off. ............ 156/909

Primary Examiner—Geoffrey L. Knable
Attorney, Agent, or Firm—IP Group of Pillsbury Madison & Sutro LLP

[57] ABSTRACT

An autoclave for retreading and/or repairing pneumatic tires by vulcanization, including a cylindrical container with an opening located at one end provided with a closure element, and a plurality of individual units carrying tires for vulcanization, to each unit there being connected a compressed air source and a vacuum-generating air evacuation source by a series of respective pipes extending between cover portions enclosing each tire and the compressed air and vacuum-generating evacuation sources. The tire-carrying units are movable between a position external to and a position within the container along a runway suspended from the container roof. The pipes being flexible hoses and are connectable to a fixed first connector-half positioned in proximity to a closed end wall of the container, using a movable second connector-half positioned at one of their ends when all the tire-carrying units have been completely inserted into the container.

2 Claims, 6 Drawing Sheets

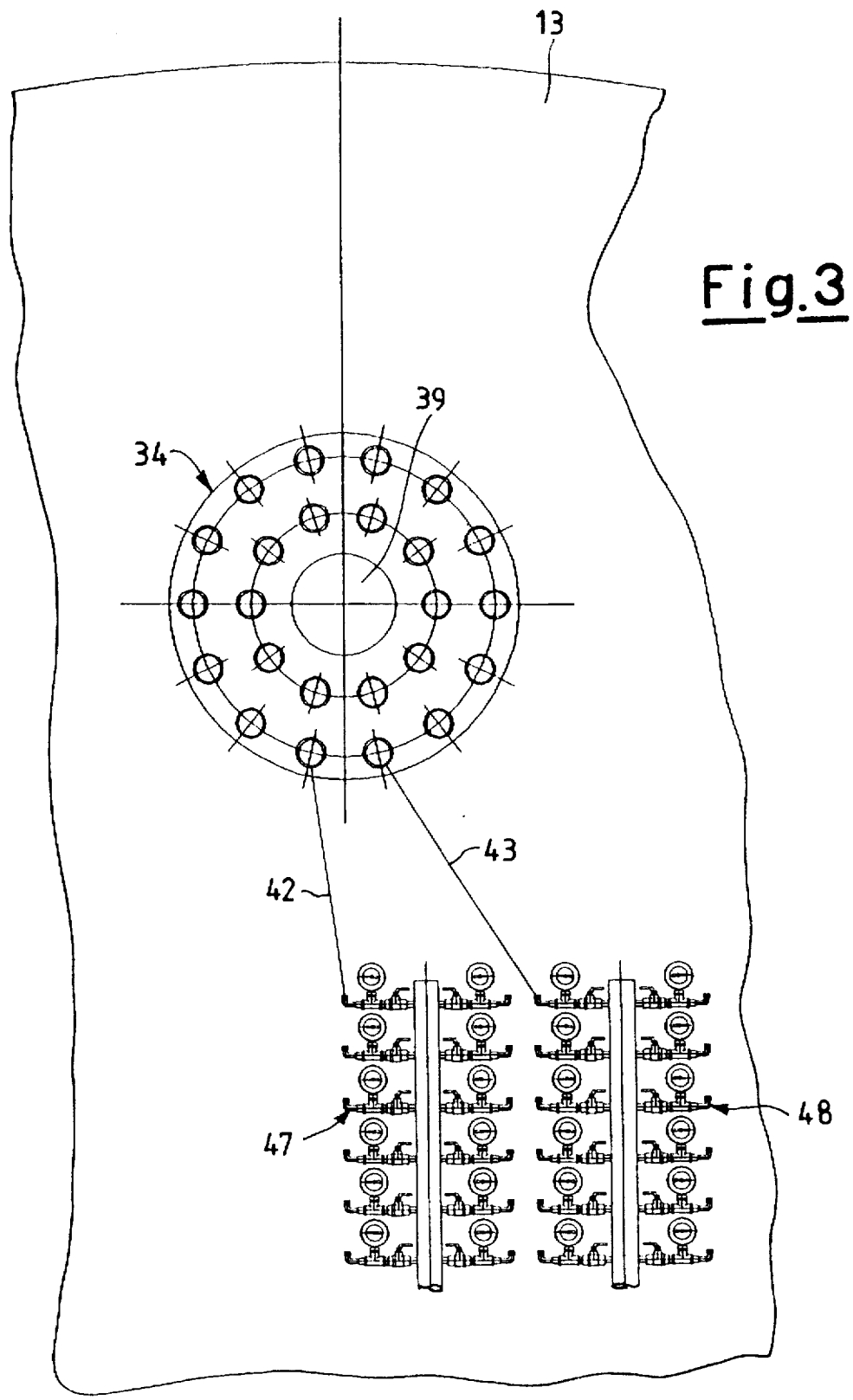

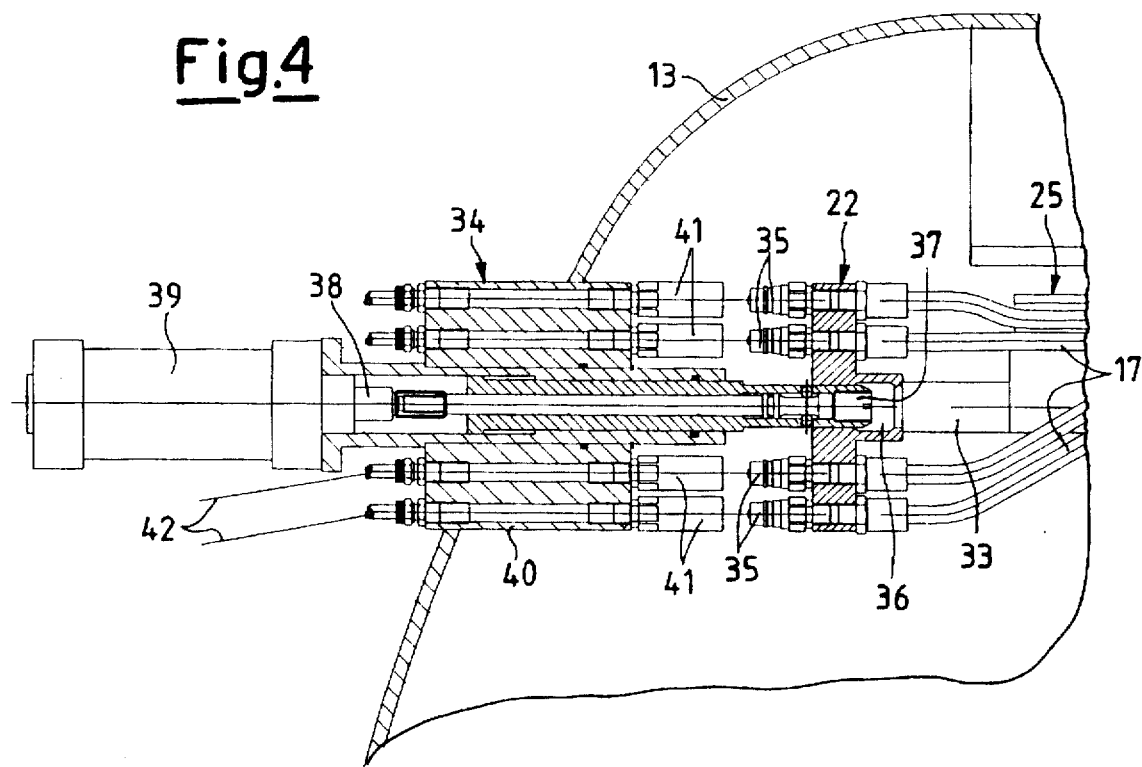
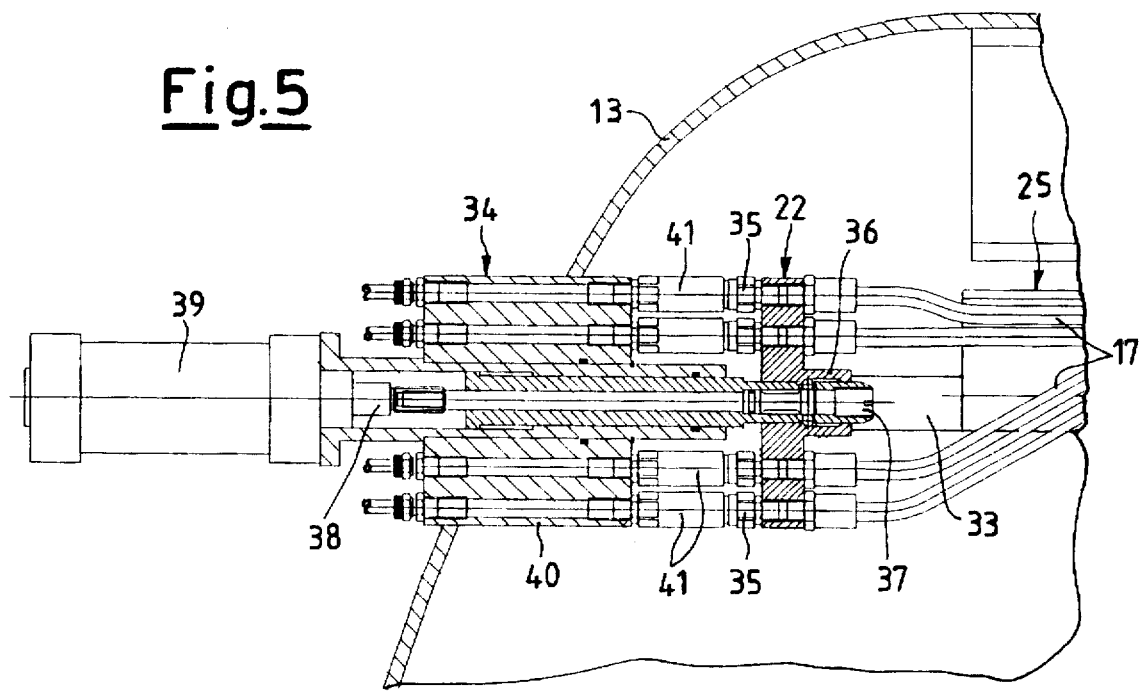

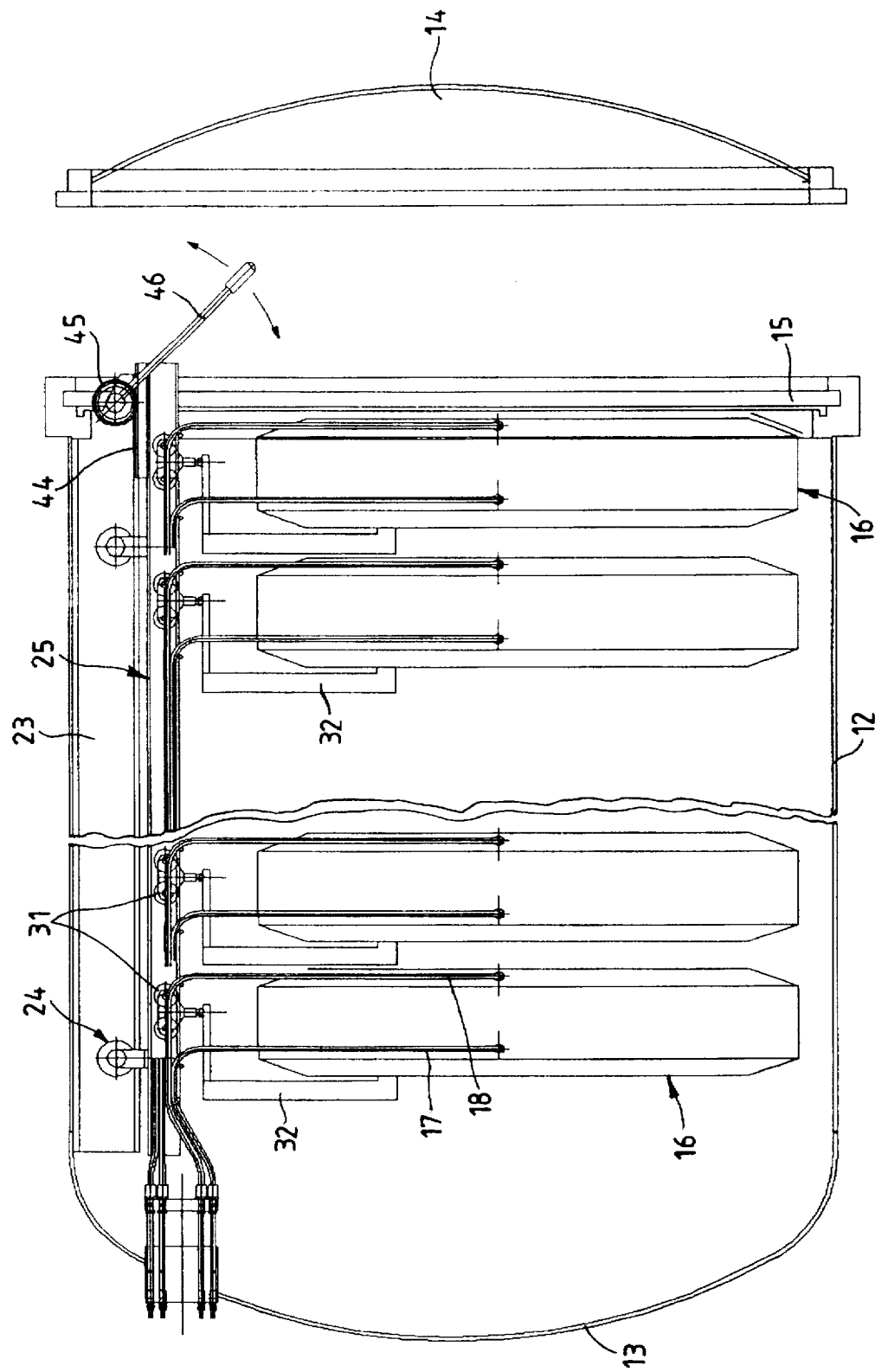

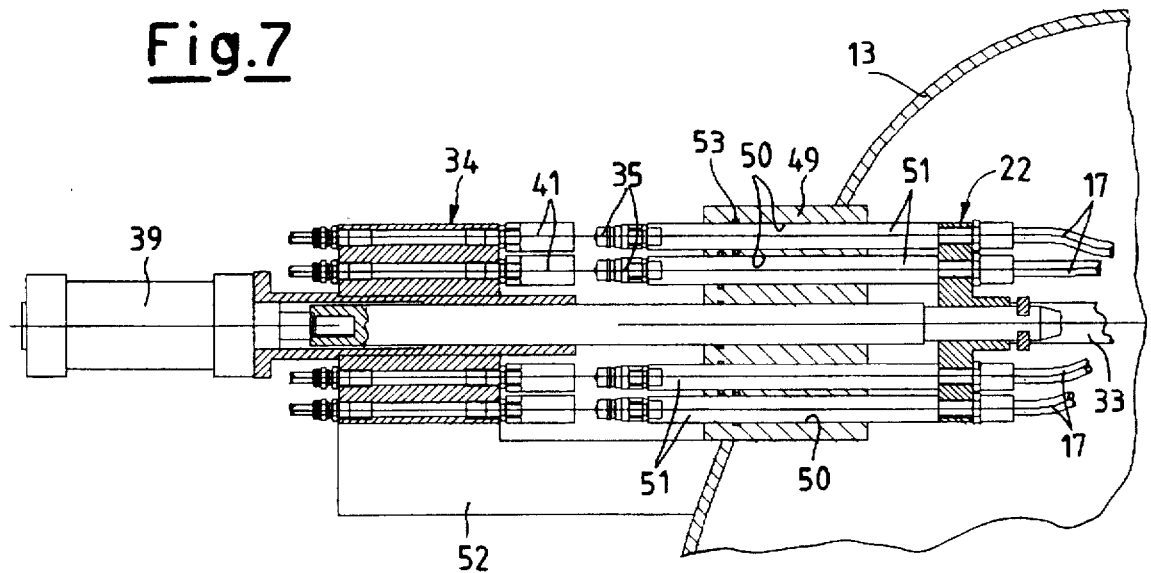
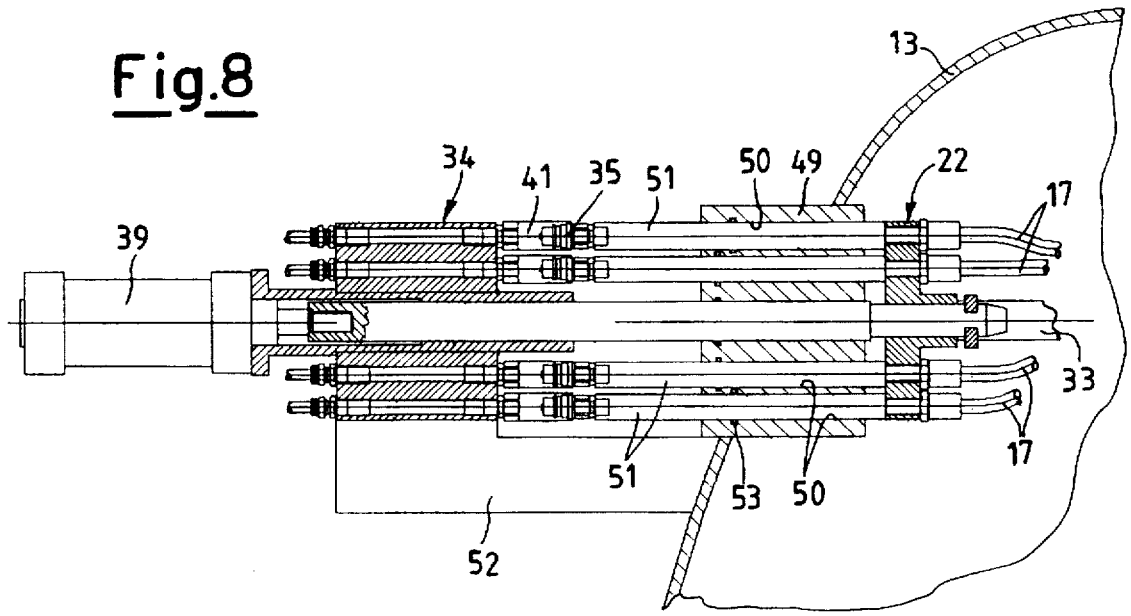

ical container with an opening located at one end provided with a closure element, and a plurality of individual units carrying tires for vulcanization, to each unit there being connected a compressed air source and a vacuum-generating

AUTOCLAVE FOR RETREADING AND/OR REPAIRING PNEUMATIC TIRES BY VULCANIZATION

BACKGROUND OF THE INVENTION

This invention relates to an autoclave for retreading and/or repairing pneumatic tires by vulcanization.

This type of autoclave has been used for some time for both the complete regeneration and partial repair of tires, as necessary. Such an autoclave generally consists of a circular cylindrical container provided with a closure element such as a door, positioned over an opening through which a plurality of units carrying tires to be vulcanized are inserted and/or withdrawn. To each individual unit there are connected a compressed air source and an air evacuation source to generate vacuum between the tire outer cover and its carcass. The various units can be moved between a position external to the container and a position within it along a runway suspended from the container roof.

In initial autoclaves of this type, the vulcanization units were inserted individually into the container, the two source pipes then being connected when all the units had been inserted, after closing the door. The drawback of this type of autoclave was that the machine operator had to enter the autoclave to connect each unit to a compressed air pipe for air feed both into the autoclave interior to act on the outer tire cover and into the carcass, and to an evacuation pipe to provide vacuum.

This problem in preparing the autoclave was at least partly solved in European patent 0 086 766, to which reference should be made for a greater understanding of the entire subject.

This solution also overcomes problems deriving from the need to connect by means of hoses and nipples a series of lines or conduits associated with the individual units carrying the tires to be vulcanized. In addition, the series of lines or conduits movable with the tire-carrying units has to be connected to the external compressed air and evacuation pipes by further hoses situated at the end of the outwardly facing support devices. This operation has to be performed close to the opening in the autoclave to maintain the advantage of avoiding the need for the operator to enter the autoclave.

SUMMARY OF THE INVENTION

An object of the present invention is to provide an autoclave for retreading and/or repairing tires by vulcanization which is simpler than the preceding, the subject of the aforesaid prior patent.

A further object is as far as possible to avoid the further problems deriving from the need to connect the air and evacuation hoses of the various tire-carrying units at the opening in the autoclave.

A further object is to provide an autoclave which enables any type of compressed air or evacuation connection to be made automatically or nearly automatically, so radically solving all intervention problems and simplifying its operational use.

These objects are attained according to the present invention by an autoclave for retreading and/or repairing pneumatic tires by vulcanization, comprising an essentially cylindrical container with an opening located at one end provided with a closure element, and a plurality of individual units carrying tires for vulcanization, to each unit there being connected a compressed air source and a vacuum-generating air evacuation source by a series of respective pipes extending between cover portions enclosing each tire to be vulcanized and said compressed air and vacuum-generating evacuation sources, said tire-carrying units being movable between a position external to the container and a position within it along a runway suspended from the roof of the container, characterised in that the pipes are flexible hoses and are connectable to a fixed first connector-half positioned in proximity to a closed end wall of the container by means of a movable second connector-half positioned at one of their ends when all the tire-carrying units have been completely inserted into the container, the first connector-half being connected to the compressed air and vacuum-generating evacuation sources.

BRIEF DESCRIPTION OF THE DRAWINGS

The characteristics and advantages of an autoclave for retreading and/or repairing pneumatic tires by vulcanization according to the present invention will be more apparent from the description thereof given by way of non-limiting example hereinafter with reference to the accompanying schematic drawings, in which:

FIG. 3 is an enlarged view from the outside showing a detail of the autoclave connection device of FIG. 1;

FIGS. 4 and 5 are detailed sections through the connection device of FIG. 1 in two operating positions;

FIG. 6 is a different embodiment of the manual device enabling the units to be securely connected within the autoclave; and FIGS. 7 and 8 are enlarged elevations of a second embodiment of the device for connecting an autoclave of the type shown in FIG. 1 to compressed air and vacuum-generating evacuation connection elements external to the autoclave.

DETAILED DESCRIPTION

Figure 1:
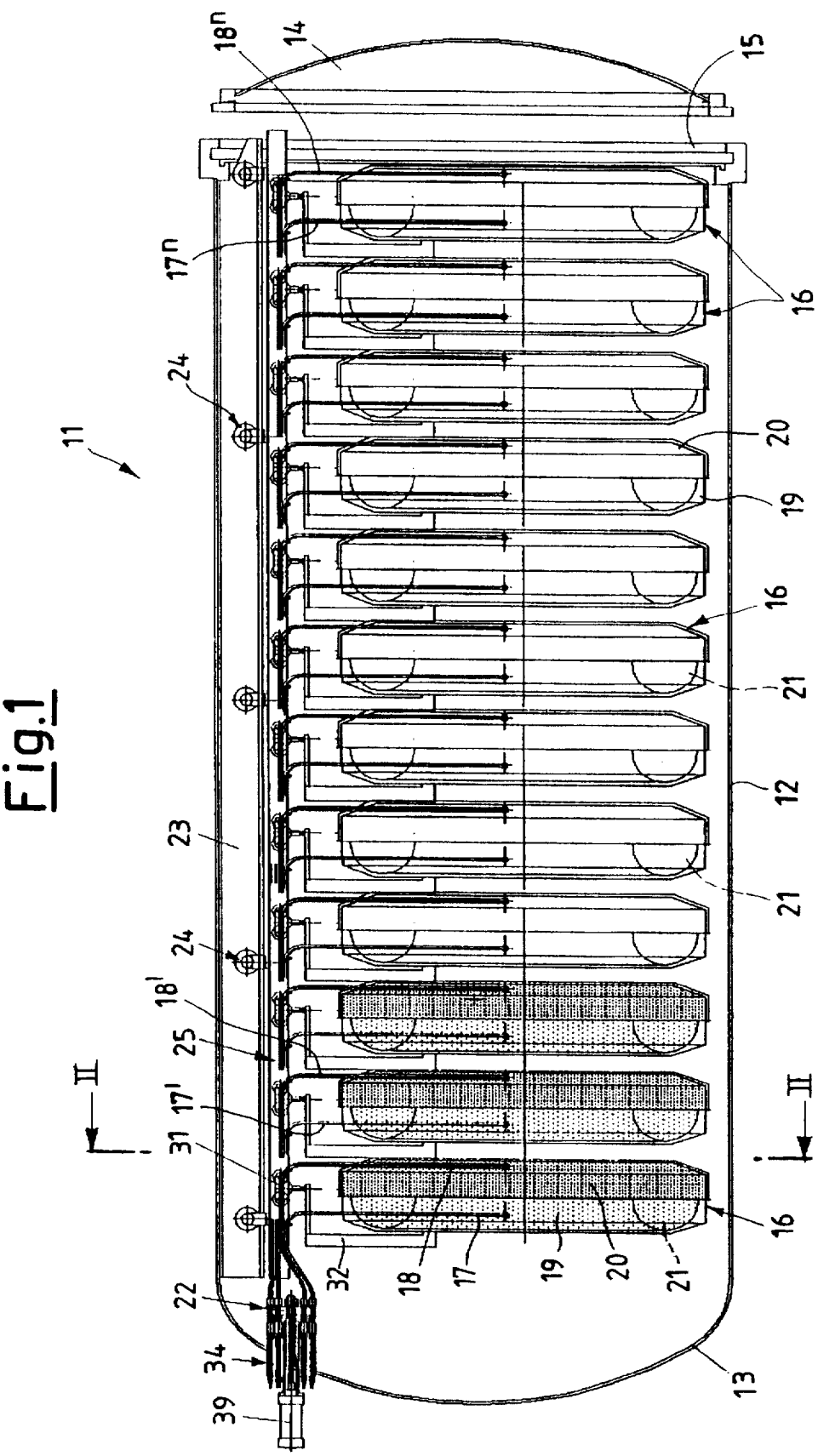
FIG. 1 is a schematic elevation of an autoclave for retreading and/or repairing tires by vulcanization according to the present invention, shown after loading and ready for use.
Figure 2:
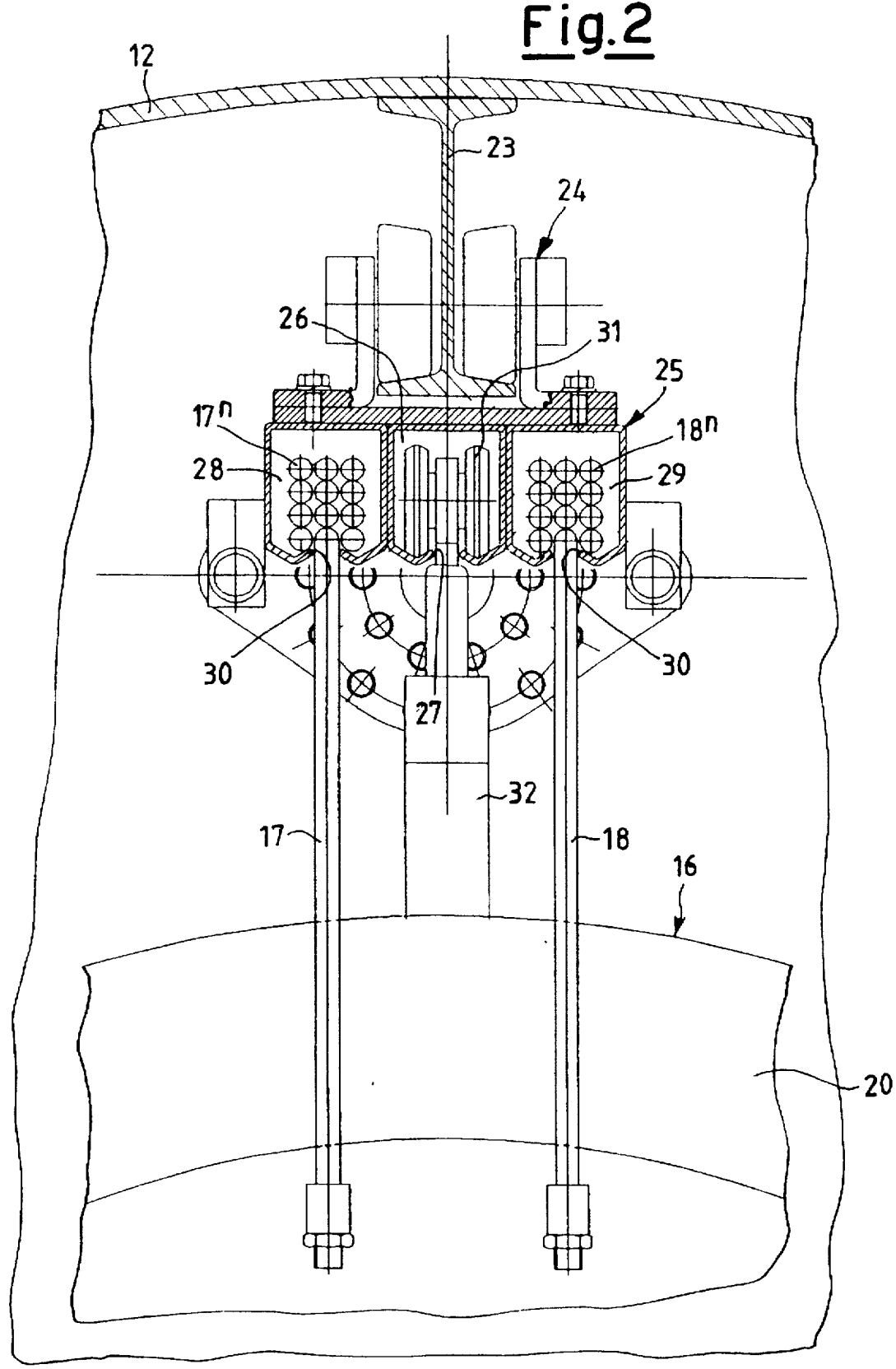
FIG. 2 is an enlarged detailed cross-section through the support and transport device for the tire-carrying units taken on the line II—II of FIG. 1.

FIGS. 1–5 show an autoclave for retreading and/or repairing tires by vulcanization constructed in accordance with the present invention and indicated overall by 11.

The autoclave 11 consists of a container 12, for example one having a cylindrical sidewall with a dome-shaped end wall 13. The other end comprises a closure element 14, such as a door. The closure element 14 is positioned at an opening 15 through which a plurality of individual units, indicated overall by 16, carrying tires for vulcanization are inserted and/or withdrawn.

A compressed air source and a vacuum-generating air evacuation source are connected to each tire-carrying unit 16 by a series of hoses 17, 17', 17", . . . 17$^n$ and 18, 18', 18", . . . 18$^n$ respectively. The hoses 17, 17', 17", . . . 17$^n$ and respectively 18, 18', 18", . . . 18$^n$ extend between portions 19 and 20 of an outer cover, known as the envelope, which enclose each tire 21 to be vulcanized, and a first half 22 of a connector unit, which is movable.

The various tire-carrying units 16 can be moved between a position external to the container 12 along a runway, not shown, and an internal position along a runway aligned with the external runway and suspended from the container roof.

In this respect, it can be seen that inside the container or body 12 of the autoclave there is fixed to the upper wall or roof a first runway 23, such as a double T beam, along which a certain number of carriages 24 slide. To the carriages 24 there is fixed a second runway 25, for example one provided as a composite structure. In the example, the second runway 25 comprises a central channel 26 provided with an aperture 27, and two lateral channels 28, 29 on opposite sides, provided with downwardly facing localized apertures 30.

Within the central channel 26 there slide second carriages 31 carrying via a hook suspension element 32 the tire-carrying units 16 used for the vulcanization. The downwardly facing central aperture 27 is longitudinal and enables the carriages 31 to slide during the loading of the units carrying the tires to be vulcanized, or during the discharge of these units when carrying the tires now vulcanized or repaired.

The two channels 28 and 29 contain portions of the hoses 17, 17', 17", . . . . 17ⁿ and respectively 18, 18', 18", . . . . 18ⁿ which, being of different lengths, reach the various tire-carrying units located one after another.

The tire-carrying units 16 are inserted into the second runway 25 before being loaded into the autoclave using the first carriages 24, a predetermined number of hoses 17, 17', 17", . . . 17ⁿ and respectively 18, 18', 18", . . . 18ⁿ being arranged in the respective lateral channels 28 and 29 in the different lengths necessary to reach the tire-carrying units 16 positioned one after another. Each of said hoses is connected to the movable first half 22 of the connector unit which is rigid with a support bracket 33 projecting from the end of the second runway 25.

Aligned horizontally with the second runway 25, and consequently with the movable first half 22 of the connector unit, there is positioned a fixed second half 34 of the connector unit, secured to the closed end wall 13 of the autoclave container 12.

With reference to FIGS. 4 and 5, it can be seen how the movable half 22 and fixed half 34 of the connector unit operate during connection and/or vice versa. In this respect, couplings 35 positioned at the ends of hoses 17, 17', 17", . . . 17ⁿ and 18, 18', 18", . . . 18ⁿ, for example male couplings with a ball or other seal preventing loss of air or vacuum, are fixed to the support bracket 33. The support bracket 33 carries a central housing 36 arranged to receive an enlarged head 37 located at the end of the rod 38 of a cylinder 39 used as the actuator, which can also be mechanical, pneumatic, etc., to form a stable coupling and connection means between the parts. The second half 34 of the connector is also in the form of a bracket or block 40 on which couplings 41, for example female couplings with a ball seal as in the preceding, or of another type, positioned at the ends of compressed air feed pipes 42 and vacuum-generating evacuation pipes 43, are fixed. The cylinder 39 is also fixed to the bracket 40.

To be able to fix the parts together, the housing 36 and the enlarged head 37 comprise portions of different cross-section and expandable ball elements, which form a monodirectional coupling by which the second part 34 of the connector is securely connected to the first part 22 and vice versa. In this manner, with the aid of the cylinder, the external pipes can be connected to the hoses connected to the tire-carrying units.

When the tire-carrying units have been finally inserted by means of the aforedescribed arrangement, the autoclave can be closed by the door 14.

The compressed air feed pipes 42 and the vacuum-generating evacuation pipes 43 are connected to a compressed air inflation regulator unit 47 and a vacuum regulator unit 48.

This final position enabling the door 14 to be closed can be achieved by a simplified alternative embodiment shown in FIG. 6, in which the cylinder and the relative seat are dispensed with. In this case, after inserting the various tire-carrying units into the autoclave, the parts to be connected are set into their final position by a lever system positioned at the opening 15 in the autoclave container 12 to act between the runway and at least the last of the tire-carrying units. This system comprises a rack 44 located on the terminal end of the second runway 25 containing all the tire-carrying units, to interact with a complementary gearwheel 45 pivoted in correspondence with the opening 15 and made to rotate by a manually operated lever 46. On operating the lever 46, the engagement between the gearwheel 45 and the rack 44 causes the second runway 25 to undergo final advancement towards the closed end of the autoclave container 12. This compels the first half 22 of the connector unit, which is rigid with the end of the second runway, to engage its second half 34 rigid with the end wall 13 of the container 12.

FIGS. 7 and 8 show a further connector embodiment, provided in proximity to the closed end wall 13 of the container 12.

In this further embodiment, the actual connection between the two connector halves 22 and 34 is made external to the container, i.e. external to the autoclave.

In this respect, the closed end wall 13 comprises a plate 49, in which a number of holes 50 are provided equal to the number of hoses 17, 17', 17", . . . 17ⁿ and 18, 18', 18", . . . 18ⁿ. Elongated cylindrical bodies 51, positioned between the, for example, male couplings 35 and the ends of the hoses, are passed through the holes 50. To the outer surface of the end wall 13 there is fixed a support bracket 52 rigidly carrying the second half 34 of the connector unit carrying couplings 41 for example of female type, in the same number as the preceding.

As in the preceding embodiment, the support bracket 52 can carry a central housing 36 to receive an enlarged head 37 positioned at the end of the rod 38 of a cylinder 39, used as the means for achieving engagement and stable connection between the parts and located on the support bracket 52. FIG. 7 shows the preconnection position, with the elongate cylindrical bodies 51 inserted through the holes 50 of the plate 49, constructed, for example, of a material which forms a seal against them, and with the possible provision of further gaskets 53 to ensure the seal in any event. FIG. 8 shows the connected position when the autoclave is operative and the hoses have been connected to the compressed air feed and vacuum-generating air evacuation pipes. Again in this case, to achieve connection between the parts, the housing 36 and the enlarged head 37 comprise portions of different cross-section and expandable elements, forming a monodirectional coupling.

According to the present invention, an autoclave is therefore provided which not only dispenses with the need for persons to enter its interior for connecting the pipes, but also automates this connection in a region distant from the operating region close to the opening through which the tire-carrying units are inserted.

In addition, all those hose pieces which previously had to be connected between the pipes moving with the carriages and the individual tire-carrying units are advantageously eliminated. The connection can in fact now be made external to the autoclave container, and can be controlled even during operation.

I claim:

1. An autoclave for simultaneously retreading and/or repairing a plurality of pneumatic tires by vulcanization, comprising:

a container including a substantially cylindrical sidewall, an opening located at one end, a closure element for operably closing said one end, and a closed opposite end wall closing an opposite end; the container being generally horizontally arranged, so that a longitudinally extensive portion of the sidewall forms a roof; a runway suspended from said roof;

a plurality of individual tire-carrying units, each arranged to carry a respective individual tire, each said unit comprising a set of cover portions arranged for enveloping a respective tire;

a source of compressed air;

a source of vacuum-generating evacuation;

a first series of pipes extending between said cover portions and said source of compressed air, for communicating compressed air to said cover portions;

a second series of pipes extending between said cover portions and said source of vacuum-generating evacuation, for evacuating said cover portions;

said tire-carrying units being supported from said runway, for movement between a first position located externally of the container, and a second position located within the container;

each respective said series of pipes comprising an individual pipe for each said set of cover portions; each said pipe including a first connector-half disposed in proximity to said closed opposite end wall; each said pipe further including a second connector-half which is disconnectably connectable with a respective said first connector-half for providing a respective connection which penetrates said opposite end wall; and each pipe further including a flexible hose having one end connected with a respective said set of cover portions and an opposite end connected with a respective said second connector-half;

said first connector-halves being supported as a group by said container;

said second connector-halves being supported as a group by said tire-carrying units for moving all of said second connector-halves into proximity with respective ones of said first connector halves as a consequence of movement of said tire-carrying units from said first position to said second position; and an actuator, actuable from externally of the container, for connecting respective ones of said first and second connector-halves when said tire-carrying units are in said second position;

said actuator being secured to one of said groups of connector-halves.

2. The autoclave of claim 1, wherein:

said actuator is a fluid-operated longitudinally extensible piston-cylinder arrangement arranged for urging one of said groups of connector-halves axially towards and into connection with the other of said groups of connector-halves.

\* \* \* \* \*